United States Patent [19]

Silva, Jr.

[11] 4,412,521

[45] Nov. 1, 1983

[54] EVAPORATIVE CARBURETOR AND ENGINE

[76] Inventor: John C. Silva, Jr., 11 Colonial Rd., Ipswich, Mass. 01938

[21] Appl. No.: 282,226

[22] Filed: Jul. 10, 1981

[51] Int. Cl.³ .................. F02M 31/00; F02M 13/04
[52] U.S. Cl. ............................ 123/522; 123/547; 123/523; 123/524; 261/83
[58] Field of Search .............. 123/522, 523, 524, 557, 123/549, 25 F, 545, 547, 585, 587; 261/DIG. 83, 122

[56] References Cited

U.S. PATENT DOCUMENTS

| | | |
|---|---|---|
| 938,011 | 10/1909 | Mieville . |
| 965,867 | 8/1910 | Bustard . |
| 1,058,407 | 4/1913 | Candlish . |
| 1,103,789 | 7/1914 | Macey . |
| 1,263,967 | 4/1918 | Van Daam . |
| 1,530,882 | 3/1925 | Chapin ................... 261/DIG. 83 |
| 1,619,894 | 3/1927 | Swartz . |
| 1,654,735 | 1/1928 | Keeling . |
| 1,724,097 | 8/1929 | Losack . |
| 1,997,497 | 4/1935 | Pogue ..................... 261/DIG. 83 |
| 2,239,181 | 4/1941 | Smith ............................ 183/23 |
| 2,306,897 | 12/1942 | Ollig ............................. 123/523 |
| 2,461,411 | 2/1949 | Cummings ................... 123/522 |
| 2,650,582 | 9/1953 | Green .......................... 123/522 |
| 2,658,489 | 10/1953 | Putt .............................. 123/75 |
| 3,049,850 | 8/1962 | Smith ............................ 55/228 |
| 3,282,033 | 11/1966 | Seppanen ...................... 123/522 |
| 3,338,223 | 8/1967 | Williams .................. 261/DIG. 83 |
| 3,348,829 | 10/1967 | Grimes ......................... 261/152 |
| 3,395,681 | 8/1968 | Walker .......................... 123/119 |
| 3,447,514 | 6/1969 | Trafford ......................... 123/523 |
| 3,713,429 | 1/1973 | Dwyre .......................... 123/522 |
| 3,728,092 | 4/1973 | Gorman ......................... 48/102 R |
| 3,749,376 | 7/1973 | Alm et al. ..................... 261/18 A |
| 3,800,533 | 4/1974 | Zankowski ................. 261/DIG. 83 |
| 3,800,768 | 4/1974 | Rhodes .......................... 123/133 |
| 3,874,353 | 4/1975 | Wooldridge .................... 123/134 |
| 3,931,801 | 1/1976 | Rose et al. ..................... 123/134 |
| 4,011,847 | 3/1977 | Fortino ..................... 261/DIG. 83 |
| 4,112,889 | 9/1978 | Harpman ....................... 123/25 B |
| 4,312,317 | 1/1982 | Jewitt ........................... 123/522 |

Primary Examiner—Ronald H. Lazarus
Attorney, Agent, or Firm—Lahive & Cockfield

[57] ABSTRACT

An evaporative carburetor has a normally pressure-tight chamber which houses an evaporator tray to which a fuel supply delivers gasoline. A first air passage in the carburetor chamber communicates from a first, automatically-valved, air inlet to pick up gasoline particles and vapor from the evaporator tray. A second air passage communicates from the evaporator tray to a mixing region and includes a particle arrester. A heater maintains the evaporator tray and the second passage above a selected temperature. A second, externally-controlled, valved inlet feeds air to the mixing region, and a third air passage communicates from the mixing region to a throttled output port. An aqueous control liquid is injected into the air stream in the third passage.

17 Claims, 7 Drawing Figures

EVAPORATIVE CARBURETOR AND ENGINE

BACKGROUND OF THE INVENTION

This invention relates to a carburetor for providing enhanced operation and fuel economy in an internal combustion engine. The carburetor, which is of the evaporative type, delivers fuel to an engine intake manifold essentially entirely in the gaseous state under varied operating conditions.

Carburetors in general use deliver unvaporized fuel, i.e. raw gasoline liquid, to the engine of an internal combustion intake manifold under commonly encountered conditions such as a cold start and heavy acceleration. Engines typically do not burn completely a significant portion of the raw gasoline. The unburned or partially burned fuel causes carbon deposits in the engine, including on the spark plugs, causes deterioration of the engine lubricant, and causes foul exhaust fumes. The delivery of raw gasoline to an engine intake manifold is also understood to contribute to an unequal distribution of fuel to the cylinders. This condition reduces engine efficiency and can increase engine wear.

An object of this invention is to provide a carburetor which delivers fuel to an engine intake manifold essentially entirely in the gaseous state. A further object is to provide a carburetor which provides such operation even under adverse operating conditions such as a cold start and heavy acceleration.

Particular objects of the invention are to provide a carburetor that delivers no raw gasoline to an engine and, further, that operates without so-called dead spots, i.e. that responds promptly to changes in accelerator control.

Another object of the invention is to provide a carburetor of the above character which provides fuel economy and controlled engine temperature.

A further object is to provide a carburetor having the foregoing features which provides relatively fast engine response to changes in accelerator control.

Another object of the invention is to provide a carburetor of the above character which can be incorporated readily in an existing internal combustion engine.

A further object of the invention is to provide an internal combustion engine having an evaporative carburetor which responds to multiple engine conditions with relatively few sensors and relatively few controls.

It is also an object of the invention to provide a carburetor of the above character which has relatively few moving parts and which can be manufactured at relatively low cost and have relatively high reliability.

Other objects of the invention will in part be obvious and will in part appear hereinafter.

SUMMARY OF THE INVENTION

A carburetor according to the invention has a housing chamber which normally is pressure-tight except for two sets of valved air inlets and a throttled output port that connects to an engine intake manifold. The chamber houses a gasoline vaporizer which receives gasoline from a fuel tank. One air inlet to the chamber is automatically valved to be normally closed and to open according to the amount by which the pressure inside the chamber, e.g. the vacuum, is below the ambient value. This automatically-valved inlet feeds an inlet passage that delivers air to the gasoline vaporizer, where the air picks up gasoline particles and vapor.

A vaporizing passage carries the air-gasoline mixture from the vaporizer to a mixing station, where the second air inlet, operating under external valve control, admits further air to the chamber. A particle arrester retards particles of the raw gasoline from exiting the vaporizing passage to the mixing station. A heater maintains the vaporizing passage and the vaporizer above a selected minimal operating temperature.

An outlet passage delivers the resultant fuel-air mixture from the mixing station to the outlet port and is fitted with injectors of water and of water vapor. The carburetor further includes internal air bypass passages which enhance vaporization of fuel in the particle arrester and which quickly respond automatically to a sharp decrease in chamber pressure, such as results from a sharp acceleration of the engine. The carburetor, in addition, is readily fitted with pressure and fire-stop safeguards.

In a preferred embodiment, the gasoline vaporizer is an evaporator tray which a fuel supply maintains filled with a selected level of raw gasoline. The inlet passage delivers air to percolate upward through the layer of gasoline. The preferred construction further provides an array of automatic one-way valves that admit the air to the bottom of the tray. Advantages of this gasoline vaporizer include that it readily provides a sufficient volume of gasoline in the tray to give the carburetor a reserve fuel capacity that is instantly available for responding to heavy acceleration. Another advantage is that it enables excess liquid gasoline in the particle arrester to return to the tray automatically, due to gravity. The particle arrester is located directly above the horizontal tray, so that liquid fuel readily drains from the arrester back to the tray. Further, baffles in the tray enable it to hold gasoline and remain operative even when sharply tilted from the normal horizontal position.

An internal combustion engine fitted with the carburetor which the invention provides has a conventional accelerator linked to the carburetor throttle valve, and has a fuel system which maintains a selected level of liquid gasoline in the carburetor evaporator tray. The engine also has a controller which receives signals from an intake manifold vacuum sensor, from an exhaust manifold temperature sensor, and from a combustion chamber temperature sensor. The controller controls one carburetor air inlet valve, and the carburetor water injection, in response to these monitored engine conditions.

The carburetor preferably also has an electric heater controlled in response to a temperature sensor for the vaporizing fuel. Another temperature sensor in the evaporator tray is connected with the fuel supply system.

The operation of an engine according to the invention typically starts with the operation of the heater in the carburetor vaporizing stage formed by the evaporator tray and the vaporizing passage. The engine is ready to start when the stage is heated to a selected temperature. The intake manifold vacuum developed upon starting the engine draws from the carburetor a fuel mixture of gasoline vapor and air for starting the engine and for running it at idle speed. The carburetor, in addition, draws water vapor in response to the intake manifold vacuum, into the fuel mixture. The engine controller adjusts the position of the controlled air valve, termed the primary valve, according to the sensed conditions of engine vacuum and temperatures. The controller normally maintains the primary valve open relatively wide to run the engine with a lean fuel-air mixture appropriate under the no-load idling condition. The other carburetor air inlet valve, termed the secondary valve, adjusts automatically in response to the vacuum difference between the ambient and the partial vacuum in the carburetor chamber to admit sufficient air to the evaporator tray for supplying the requisite amount of fuel vapor to the engine. The fuel supply system delivers fuel to maintain the desired level of gasoline in the evaporator tray. It further can maintain a flow of gasoline into and out of the tray, and back to the fuel tank, to limit an unduly high gasoline temperature in the tray.

As the vehicle operator accelerates the engine, the secondary air valve automatically opens further and the controller adjusts the primary air valve, typically by partially closing it. An optional air bypass within the carburetor automatically opens quickly upon engine acceleration, to enhance the smoothness of the engine response.

The water injection, herein also termed a water spray to ensure distinction from the noted injection, in addition, of water vapor, is adjusted by the controller in response at least to the sensed combustion chamber temperature. A substantial portion of the water spray enters the intake manifold as minute water particles. The heat in the manifold and cylinders expands and vaporizes the water particles. The heat absorption by the water particles controls the engine combustion temperature, and the expansion in the cylinders can enhance the engine performance. For this operation, aside from the delivery of water vapor, the controller delivers little, if any, water spray to the carburetor outlet passage upon engine start up and initial idling. It injects the water spray increasingly as the combustion chamber temperature increases, and thereafter continues to regulate the spray volume with engine combustion temperature.

The overall operation of the engine system according to the invention continuously provides a fuel mixture that is essentially entirely gaseous and correspondingly free of raw gasoline. The gasoline vapor is relatively well mixed with air. The mixture also includes a minor portion of water vapor, plus a controlled water spray. The fuel mixture distributes relatively uniformly to the several engine cylinders. These and other operating features of the carburetor as described and apparent below result in the engine running with a lean fuel mixture under an unusually wide range of opeating conditions. The engine accordingly operates with high fuel efficiency and with minimal carbon buildup or contamination. Further, the engine combustion temperature is well controlled due to the automatic introduction of water to the fuel mixture.

Features of the invention thus include evaporative carburetor apparatus having a normally pressure-tight chamber with an outlet port for communication with an internal combustion engine intake manifold, a gasoline vaporizer within the chamber to which a fuel supply delivers liquid gasoline, a first valved air inlet for admitting air to the interior of the chamber, and which is normally closed and opens automatically in response to the difference between ambient pressure and the lower pressure in the chamber interior, and, a first air passage within the chamber between the first inlet and the fuel vaporizer, so that air drawn into the first inlet and the first air passage to the outlet port picks up gasoline from the fuel vaporizer. The carburetor apparatus further has a second air passage within the chamber in series with the first air passage and communicating between the fuel vaporizer and the outlet port, has a heater for fluid passing in the second passage from the fuel vaporizer to the outlet port, and has a second externally-controlled inlet for admitting air to the second passage.

A further feature of the carburetor apparatus is injection means for introducing water vapor and spray to the fuel mixture along the passage which extends between the fuel vaporizer and the outlet port.

The carburetor apparatus also features a fuel vaporizer that employs an evaporator tray with a selected level of gasoline therein and through which air percolates. A unique system of one-way valves in the bottom of the tray admits the air.

Another feature is a particle arrester which removes liquid gasoline particles from the fuel mixture before it enters the engine.

It is also a feature that the carburetor apparatus has a first bypass air passage communicating between the first air passage and the second air passage and bypassing the fuel vaporizer, such a by-pass passage including normally-closed pressure responsive valve means seated therein for the delivery of air from the first air passage to the second air passage.

The invention accordingly comprises the features of construction, combinations of elements, and arrangement of parts exemplified in the construction hereinafter set forth, and the scope of the invention is indicated in the claims.

BRIEF DESCRIPTION OF DRAWINGS

For a fuller understanding of the nature and objects of the invention, reference should be made to the following detailed description and the accompanying drawings, in which.

DESCRIPTION OF ILLUSTRATED EMBODIMENT

Figure 1:
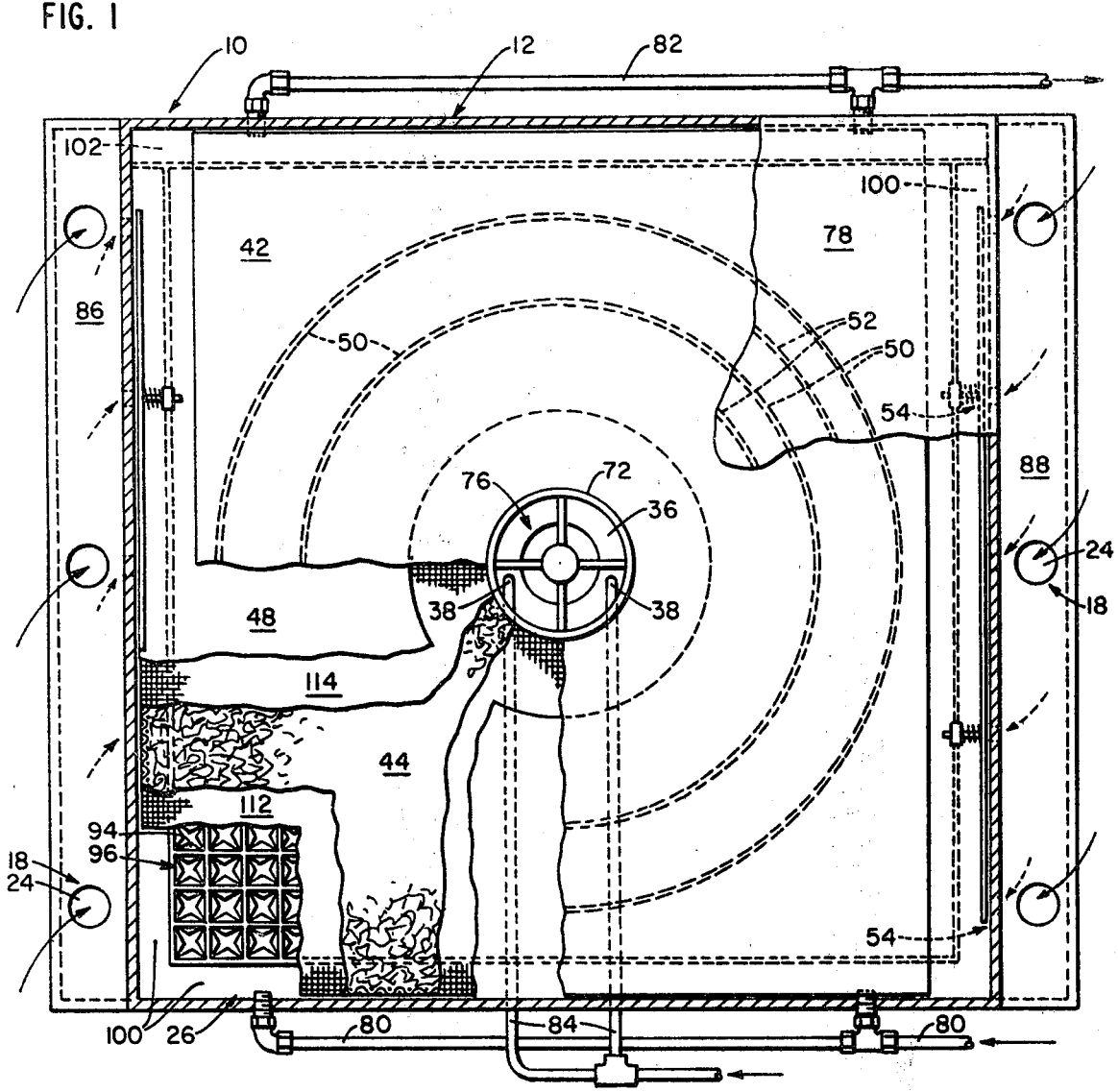
FIG. 1 is a plan view, partly broken away, of a carburetor according to the invention.
Figure 2:
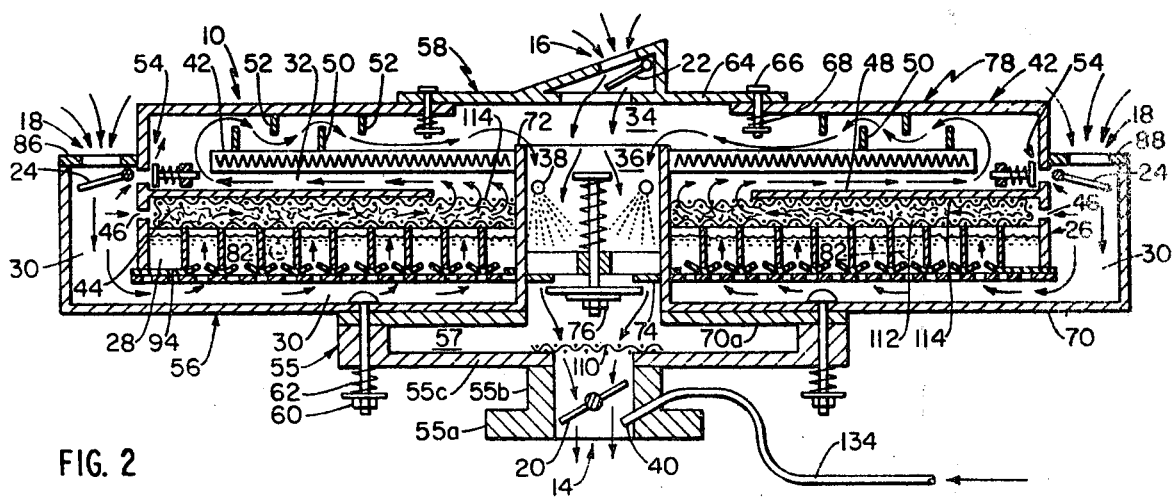
FIG. 2 is a transverse cross-sectional view of the carburetor of FIG. 1 taken along line 2—2.

FIGS. 1 and 2 show a carburetor 10 according to the invention with a housing chamber 12 which normally is substantially pressure-tight except for openings at an outlet port 14, a primary air inlet 16, and a set of secondary air inlets 18. The outlet port is structured for attachment in a conventional manner to the intake manifold of an internal combustion engine and is fitted with a throttle valve 20 which is linked in a conventional manner to an accelerator peddle or like control. The air inlet 16 is fitted with a primary valve 22 that is controlled by a separate controller as described below with reference to FIG. 6. Each secondary inlet 18 is fitted with an automatic secondary valve 24. FIG. 2 shows the throttle valve 20, the primary valve 22, and each secondary valve 24 in a partially open position.

As also shown in FIGS. 1 and 2, within the housing chamber 12 is a fuel vaporizer in the form of an evaporator tray designated generally at 26. The carburetor is normally in the horizontal orientation shown in FIG. 2, which orients the tray horizontally and upright. A fuel system (FIG. 6) maintains a layer of liquid gasoline 28 in the tray 26. A manifold-like inlet air passage 30 delivers air from the secondary inlets 18 to the evaporative tray 26 below the level of the gasoline therein so that the air bubbles and percolates upward through the layer of gasoline in the tray. The air accordingly picks up and entrains both vapor and particles of the gasoline 28. The gasoline-bearing air traverses a vaporizing passage 32 in which liquid gasoline in the air flow vaporizes and residual unvaporized particles are stripped from the air. The fuel vapor-bearing air exits the vaporizing passage to a mixing region 34 at the top center of the illustrated carburetor construction.

The primary inlet 16 introduces fuel-free air to the chamber 34 for mixing with the fuel-bearing air from the vaporizing passage. The resultant fuel mixture is drawn downwardly from the mixing chamber through a vapor feed passage 36 to the carburetor outlet port 14. The vapor feed passage is fitted with water injectors 38 located proximal to the mixing region 34, and is fitted with a vapor injector 40 located below the throttle valve 20. A water supply (FIG. 6) delivers a water vapor-air mixture to the vapor injector 40 and is connected to deliver to the water injectors 38 an amount of water determined by an external controller, typically the same controller which operates the primary valve 22.

With further reference to FIGS. 1 and 2, an electrically-operated, thermostatically-controlled heater 42 is mounted within the carburetor chamber 12 to maintain the temperature at the evaporator tray 26 and vaporizing passage 32 above a selected temperature, typically 200 degrees Fahrenheit to 220 degrees Fahrenheit.

A fuel particle arrester 44, illustratively formed as a pad of thin stainless steel or like inert wire, is disposed in the carburetor vaporizing passage 32 overlying the evaporator tray 26. The particle arrester in effect traps particles of liquid gasoline which the air flow carries out of the tray. The gasoline particles either fall back into the tray from the arrester or vaporize into the air flow.

Other structural elements of the illustrated carburetor include air bypass passages 46, between the inlet passage 30 and the vaporizing passage 32, for feeding inlet air directly to the particle arrester 44. This bypass air scours fuel from the arrester into the air flow feeding into the mixing region 34.

The vaporizing passage 32 provides a baffled tortuous path between the vaporizor tray 26 and the mixing region 34 in order to lengthen the fluid transit time therethrough and thereby increase the amount of gas vaporization and the gas-air mixing. A baffle plate 48 overlying the particle arrester 44, and the plate-like geometry of the heater 42 which is spaced thereabove, form a Z-shaped air path through the vaporizing passage 32 for this purpose. Further, interleaved baffles 50 and 52 projecting respectively upward from the plate-like heater 42 and downward from the top of the housing chamber 12 elongate the air path in the portion of the vaporizing passage 32 which is above the heater and feeds into the mixing region 34.

The illustrated carburetor also has automatically-valved air bypass passages 54 between the inlet passage 30 and the vaporizing passage 32. The valved passages 54 are normally closed and open according to the amount of pressure drop in the vaporizing passage 32 relative to the vacuum in the inlet passage 30. Such a pressure drop can occur during a sudden drop in the engine intake manifold vacuum. This automatic pressure responsive operation of the valved bypass passage 54 generally augments the operation of the controller-driven primary valve 22, as described further hereinafter.

Figure 3:
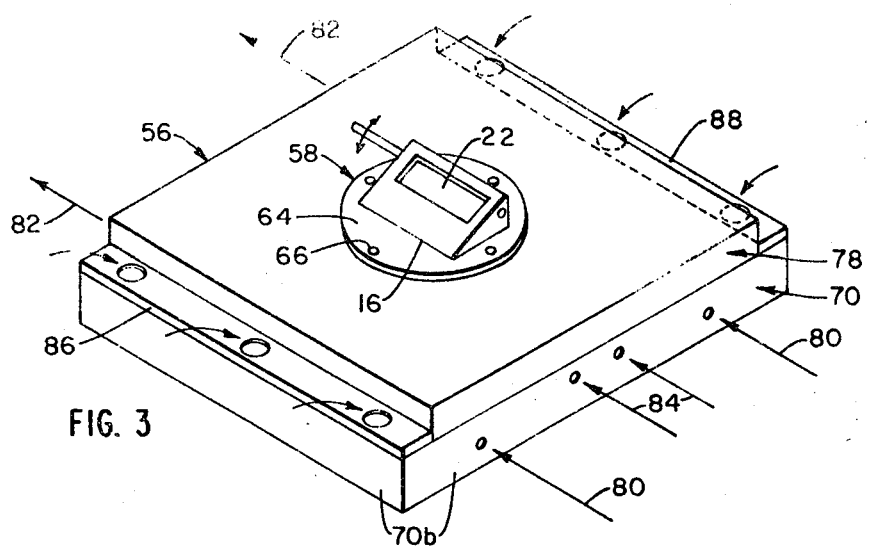
FIGS. 3 and 4 are upper and lower orthogonal views, respectively, of the carburetor of FIG. 1.
Figure 4:
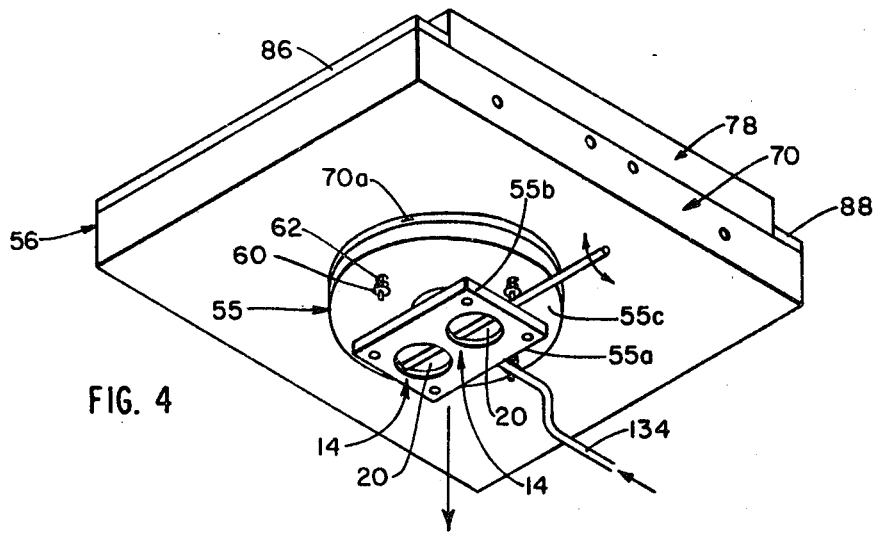

With reference to FIGS. 2, 3 and 4, the illustrated construction includes three sections, a mounting section 55, a body section 56 and a cover section 58. The sections are assembled to form the pressure-tight housing chamber 12, typically using gaskets and other conventional and known sealing arrangements which, for simplicity, are omitted from the drawings. However, the assemblage includes pressure-release mechanisms which allow the sections to separate and thereby release excessive internal pressure, for protective safety reasons. The mounting section 55, typically a unitary part cast or otherwise fabricated of metal, has a mounting flange 55a for connection with the engine intake manifold, a throttle-mounting neck 55b and a flanged top plate 55c. The flanged top plate is enlarged laterally beyond the neck 55 and with the flange thereon forms an outlet chamber 57 (FIG. 2) at the juncture with the body section 56. The two sections are assembled with bolts 60 fitted with compressed springs 62. This assemblage joins the two sections with a seal that is pressure-tight for all pressures encountered in normal engine and carburetor operations. In the event that pressure within the chamber 57 becomes excessively high, as can occur from an engine backfire, the body section can separate from the mounting section by moving against the compressive action of the bolt-carried springs 62, and thereby safely vent the chamber 57 to the atmosphere. The excess pressure condition further causes all the one-way valves to close automatically; i.e. the valves 94 in the evaporator tray, the central valve 36, the valved by-pass 54, the primary control valve 22 and the secondary valve 22.

The cover section 58, typically also made of die cast or other metal as conventional for automotive carburetor parts, mounts on the body section 56 to form the top wall of the mixing region 34. The illustrated section 58 includes a top plate 64 having a central opening and on which are mounted the primary inlet 16 and the primary valve 22. The top plate 64 is mounted to the carburetor body section with further bolts 66 fitted with compression springs 68 to provide a normally pressure-tight and excess pressure-relieving assemblage with the body section.

The illustrated body section 56 has a pan-shaped bottom shell 70 which forms a wall section 70a that seats on the carburetor mounting section 55, and which forms a peripheral wall 70b. The shell thus in part bounds the carburetor inlet passage 30. A hollow column 72 (FIG. 2) extends upward from a central opening in the shell 70 to form an upper portion of the carburetor vapor feed passage 36. The water ejectors 38 are mounted to project within from the upper portion of the column 72 as shown in FIGS. 1 and 2. A lower portion of the column 72 mounts an annular valve shoulder 74 against which a one-way valve 76 can seat. The valve automatically opens during normal operation, under the partial vacuum in the intake manifold, but closes when the engine is not operating or in the event of a backfire or other condition of excess pressure in the outlet chamber 55. The valve thus blocks excessive pressures from the carburetor mixing region 34, vaporizing passage 32, and evaporator tray 26.

The illustrated body section 56 also has an upper shell 78 that mounts to the bottom shell 70 and which forms a portion of the peripheral walls and the top walls of the housing chamber 12. On two opposite sides of the illustrated carburetor, shown at the top and bottom of FIG. 1, the peripheral walls of the bottom shell 70 and of the upper shell 78 join. A fuel inlet conduit 80 and outlet conduit 82 which are connected with the evaporator tray 26 pass through these opposed peripheral walls, as does the tubing 84 which feeds the water injectors 38.

On the other pair of opposed sides of the carburetor, shown at the right and the left in FIG. 1, the peripheral wall of the top shell 78 is spaced inwardly from the peripheral wall of the bottom shell 70. An apertured plate 86, 88 is mounted over the resulting space between the upper and lower peripheral walls. Openings in each cover plate provide the carburetor secondary inlets 18 and the secondary valves 24 are mounted on the cover plates.

The bypass passages 46 which augment the airflow through the particle arrester 44, and the further bypass passages 54 fitted with normally closed valves which automatically open in response to pressure differential, aperture the peripheral wall of the upper shell 78. The latter bypass passages feed from the inlet passage 30 to the region of the vaporizing passage 32 upstream from the particle arrestor 44, as appears in FIG. 2.

Figure 5:
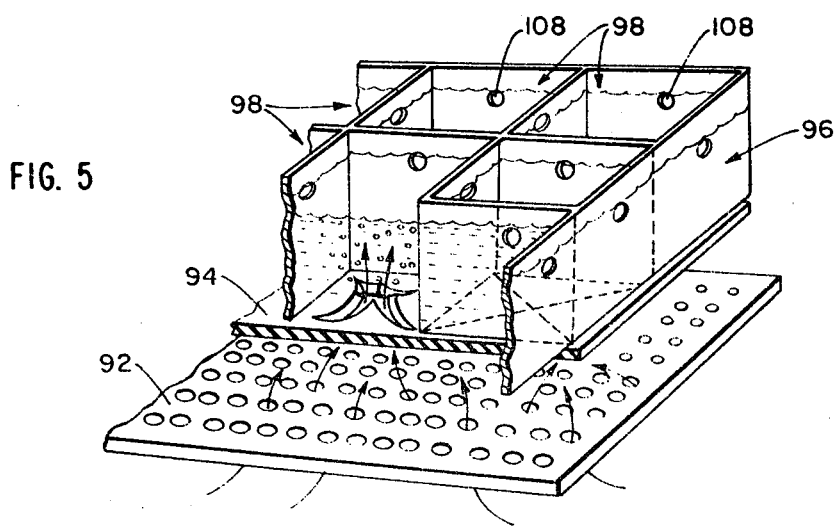
FIG. 5 is a detailed view of the evaporator tray structure of the carburetor of FIG. 1.

As further shown in FIGS. 1 and 2 and the detailed view of FIG. 5, the evaporator tray 26 is mounted on the column 72. The tray has a perforate, normally horizontal, bottom support plate 92 which extends between the column 72 and the peripheral wall of the upper shell 78. An elastomeric sheet 94 extends across the top of the plate 92 and an egg crate-like array 96 of compartments 98 is seated on the sheet 94. The plate 92 and sheet 94 thus form the bottom of the tray 26 and the compartments 98 form the tray side walls. The sheet 94 is cut through with a crossed, X-like cut at the bottom of each compartment 98 to form pressure-responsive valving flaps 94a at the bottom of each compartment 98. The valving flaps are free to resiliently move upward from the plate 92 for the admission of air to the tray, but the plate 92 below the sheet prevents downward movement of the flaps. The flaps thus form an array of one-way valves which admits air to the bottom of each compartment 98, but which effectively close preventing the downward loss of fluid, e.g. gasoline, from the tray compartments. Whatever gasoline that leaks downward through the valve-forming sheet 94 is contained in the passage 30 by the bottom shell 70, and is quickly removed by the air flow in the passage 30.

As further shown in FIGS. 1 and 2, an inlet trough 100 extends along three sides (the right, left and bottom in FIG. 1) of the illustrated tray 26, and an outlet trough 102 extends along the remaining fourth side. The inlet pipe 80 delivers gasoline to the inlet trough 100 for filling the tray 26. Overflow from the tray enters the trough 102 and returns to the fuel tank via the outlet pipe 82.

Within the array 96, the compartment walls are apertured with transfer holes 108 (FIG. 5), that allow the gasoline to distribute throughout the tray with essentially a uniform depth. In one illustrative embodiment of the invention this depth is in the order of three-quarters of an inch.

With further reference to FIGS. 1 and 2, the particle arrester 44 spans across the top of the tray 26 between the column 72 and the upper shell 78 peripheral wall. The particle arrester in one embodiment is a mat of stainless steel wire, similar to a pad of steel wool. The baffle plate 48 overlies the particle arrester 44. As shown, it can be a metal plate extending inwardly from the upper shell 78 peripheral wall for a major portion of the distance to the central column 72. The heater 42 preferably is also a plate-like structure extending outward from the column 72 upper portion at a location spaced above the baffle plate 48 and below the housing chamber 12 top which the upper shell 78 and the cover section 58 form. The heater 42 thus forms a baffle similar to, but interleaved with, the baffle plate 48.

As a further protective measure, the carburetor construction illustrated has a fire-stopping screen 110 of heat-absorbing metal spanning across the vapor feed passage 36 at the top of the throttle-mounting neck 55b. A like fire-stop screen 112 is interposed between the evaporator tray 26 and the particle arrester 44 and spans across the entire top of the tray. A further screen 114 is located between the arrester 44 and the baffle plate 48, spanning the entire distance between the column 72 and the upper shell 78 peripheral wall.

Figure 6:
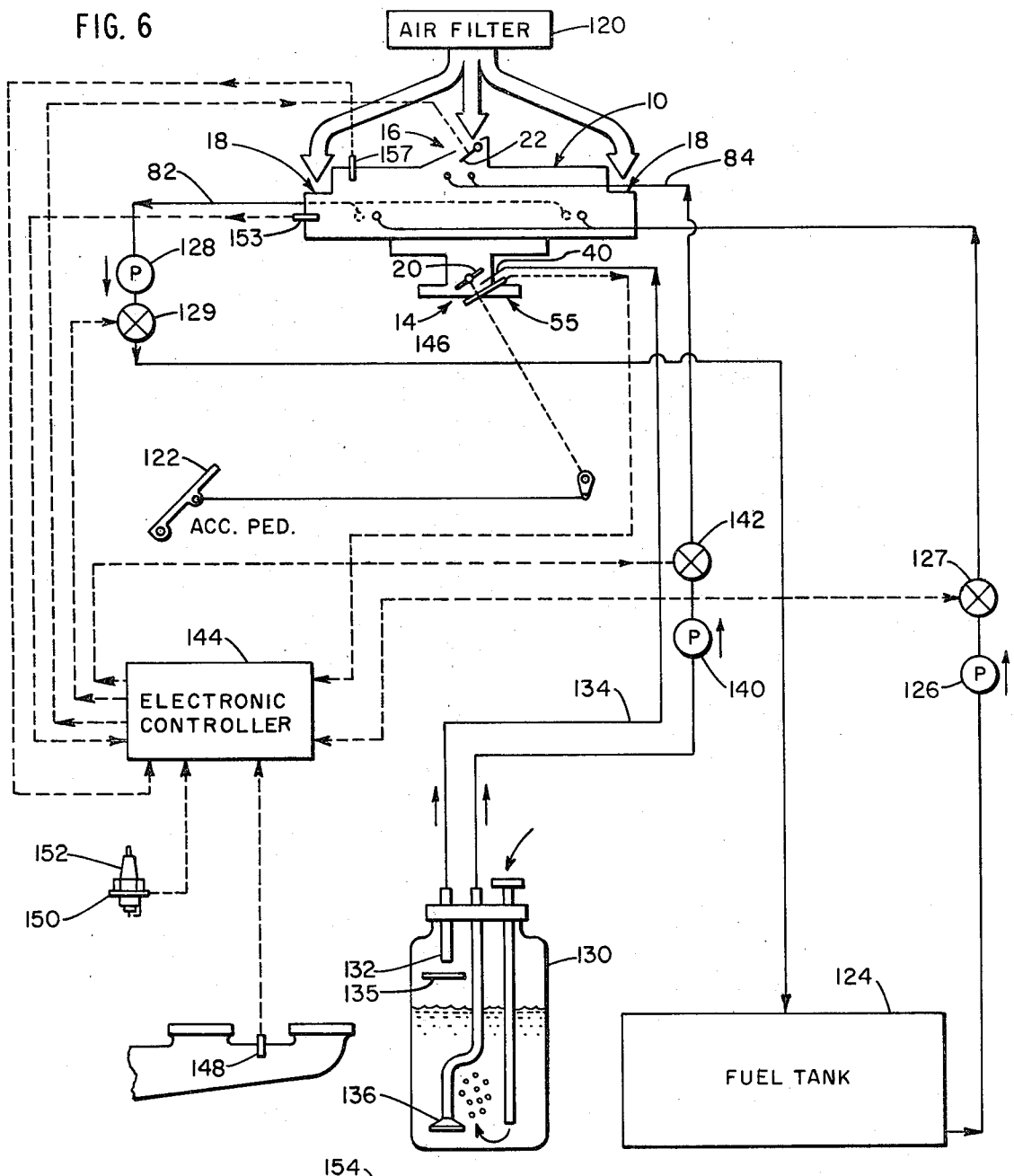
FIG. 6 is a schematic representation of an engine according to the invention.

FIG. 6 shows the carburetor 10 of the invention connected with other elements of an internal combustion engine. An air filter 120 delivers air from the environment to the carburetor inlets 16 and 18, and an accelerator 122 is linked in conventional manner with the throttle valve 20. A fuel tank 124 feeds gasoline by way of the gas inlet pipe 80 and a fuel delivery pump 126 and control valve 127 to the evaporator tray 26 of the carburetor. A fuel return pump 128, and a control valve 129 where appropriate, connected in the gas outlet pipe 82 return excess fuel from the tray to the tank 124.

A vented water tank 130, preferably containing sufficient alcohol to prevent the water from freezing under severe winter temperature and to enhance the vaporization of the water in the combustion chamber, has an outlet 132 for airborne water vapor which a conduit 134 feeds to the vapor injector 40 of the carburetor. An outlet 136 at the base of the tank picks up the water mixture and the conduit 84 feeds it to a pump 140 and through a metering valve 142 for delivery to the water injector 38.

An electronic controller 144 operates the primary air valve 22 and the water-metering valve 142. The controller 144 responds to signals from an intake manifold vacuum sensor 146, typically mounted in the neck of the carburetor mounting section 55, from an engine exhaust manifold heat sensor 148 and from a combustion chamber temperature sensor 150. The latter sensor typically is a thermocouple device seated with or adjacent a spark plug 152 of the engine, as illustrated.

The controller 144 also can operate the fuel pumps 126 and 128, and the valves 127 and 129, in response to the temperature of the gasoline in the tray 26, as measured with a sensor 153, to limit the gasoline temperature, typically to around 100°–120° F.

Figure 7:
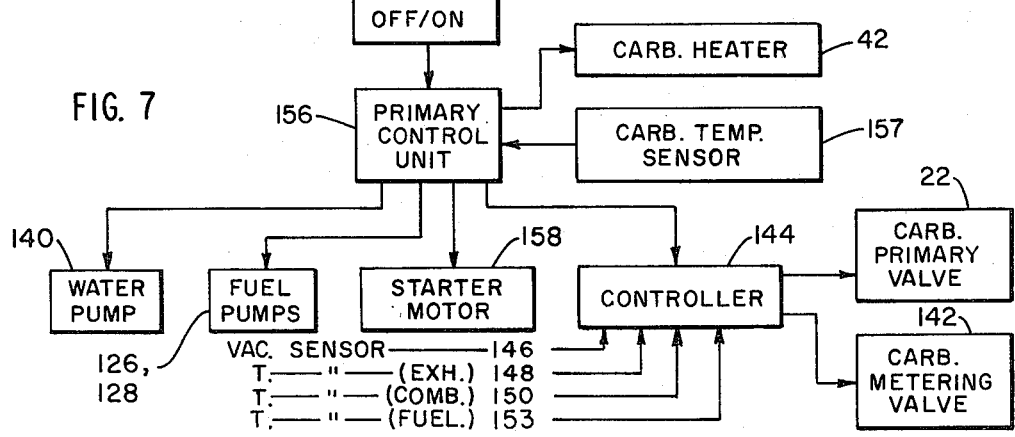
FIG. 7 is a schematic drawing of control elements for the engine of FIG. 6.

FIG. 7 illustrates one circuit for an engine fitted with the carburetor 10 in the manner of FIG. 6. The on-off ignition switch 154 energizes a primary control unit 156 to turn on the carburetor heater 42. A temperature sensor 157 in the thermostatically-controlled heater 42 signals the control unit 156 when the carburetor has attained the minimum operating temperature. At that point the control unit actuates a starter motor 158 of conventional configuration to start the engine. Concurrently, the primary control unit 156 turns on the carburetor water pump 140 and the carburetor delivery and return fuel pumps 126 and 128, and energizes the carburetor controller 144. The controller 144 receives signals from the sensors 146, 148 and 150, and operates both the carburetor primary valve 22 and the carburetor water metering valve 144, in the manner described.

In typical operation of the engine of FIGS. 6 and 7 after the heater 42 has attained the desired minimal temperature, the controller 144 closes the water-controlling valve 142 in response to the initial low engine temperature and partially closes the primary valve 22 to attain a fuel mixture for starting the engine. The secondary valve 24 opens relatively wide in response to the intake manifold vacuum as the starter motor 158 starts the engine. The controller 144 opens the primary valve 22 after the engine starts, and the secondary valve 24 correspondingly closes partially to attain a leaner fuel mixture for idling. The controller selectively opens the valve 142 to inject water into the fuel mixture as the engine combustion chamber temperature rises.

The controller thereafter adjusts the air valve 22 to provide the engine with an optimal lean fuel mixture according to conditions such as the accelerator 122 setting and the engine load, as these and other conditions effect the sensors 146, 148 and 150. The controller controls the resultant engine combustion temperature, i.e. regulates the temperature increase, by adjusting the valve 142 to control the water injection. For this operation the primary control unit 156 can employ conventional thermostatic control techniques, typically using relays. The controller 144 likewise can employ conventional engine control techniques, preferred examples of which are found in microprocessor-controlled engines.

It will thus be seen that the objects set forth above, among those made apparent from the preceding description, are efficiently attained. Since certain changes may be made in the above construction without departing from the scope of the invention, it is intended that all matter contained in the above description or in the accompanying drawings be interpreted as illustrative and not a limiting sense. By way of non-limiting example, the carburetor of the invention can employ a fuel vaporizer other than the illustrated evaporator tray, which is deemed a preferred embodiment. Illustrative of other embodiments are known vaporizer structures in which liquid is fed to a liquid-bearing mesh or sponge that is disposed in the path of an air stream.

It is also to be understood that the following claims are intended to cover all generic and specific features of the invention herein described, and all statements of the scope of the invention which, as a matter of language, might be said to fall therebetween.

Having described the invention, what is claimed as new and secured by Letters Patent is:

1. Evaporative carburetor apparatus comprising
    A. means forming a normally pressure-tight carburetor chamber having an outlet port for communication with an internal-combustion engine intake manifold,
    B. normally horizontal evaporator tray means mounted within said chamber for containing a selected level of liquid gasoline,
    C. a first valved air inlet for admitting air to the interior of said chamber, said inlet being normally closed and opening automatically in response to the difference in pressure between ambient and a lower pressure in the chamber interior,
    D. means providing a first air passage within said chamber between said first inlet and a level in said tray means below said selected level, so that air drawn into said first inlet and said first passage to said outlet port passes through liquid gasoline in said tray means,
    E. means providing a second air passage within said chamber in series with said first passage and communicating between said tray means and said outlet port,
    F. means for heating fluid passing in said second passage from said tray means to said outlet port, and
    G. a second valved air inlet for admitting air to said chamber along said second passage, said second inlet being externally operable between a substantially airtight closed position and an air passing open position.

2. Carburetor apparatus according to claim 1 further comprising fluid injection means for introducing aqueous fluid to said chamber along the air passage extending between said tray means and said outlet port.

3. Carburetor apparatus according to claim 2 further comprising water supply means for delivering aqueous fluid to said fluid injection means.

4. Carburetor apparatus according to claim 1 further comprising fuel supply means for maintaining a selected level of liquid gasoline in said tray means.

5. Carburetor apparatus according to claim 1 further comprising means in said second passage for providing baffled air flow exposed to said heater means.

6. Carburetor apparatus according to claim 1 further comprising a first bypass air passage communicating between said first air passage and said second air passage and bypassing said tray means, said first bypass passage including normally closed pressure responsive valve means seated therein for the delivery of air from said first passage to said second passage.

7. Carburetor apparatus according to claim 1 further comprising means in said second air passage for arresting the airborne passage of liquid therein.

8. Carburetor apparatus according to claim 1 in which said second air passage includes a vaporizing section in series with a mixing region, said mixing region receiving an air-gasoline vapor mixture from said vaporizing section and receiving air from said second inlet.

9. Carburetor apparatus according to claim 8 further comprising an outlet section in said second air passage arranged in series between said mixing region and said outlet port, said outlet section having a throttle valve and having fluid injection means for introducing aqueous fluid to said chamber along the air passage extending therein to said outlet port.

10. Carburetor apparatus according to claim 9 in which said fluid injection means includes a water injector for introducing water to said passage between said mixing region and said throttle valve and a vapor inlet for introducing aqueous vapor to said air passage between said throttle valve and said outlet port.

11. Carburetor apparatus according to claim 1 further comprising pressure-release means for venting from said carburetor chamber pressure in said second air passage in excess of a selected value.

12. Carburetor apparatus according to claim 1 further comprising a plurality of automatically operating one-way air valves for communicating air from said inlet passage to the bottom of said evaporative tray means.

13. Carburetor apparatus according to claim 12 comprising a sheet-like element having multiple valving-apertures therethrough for providing said one-way air valves.

14. An evaporative carburetor comprising
   A. an outlet passage having a fuel-mixture outlet port for connection to the intake manifold of an internal combustion engine,
   B. means forming a first air inlet for delivering air to said outlet passage,
   C. first air controlling valve means for selectively opening and closing said first air inlet,
   D. means forming a vapor passage for delivering a gasoline-air vapor mixture to said outlet passage in addition to air from said first inlet,
   E. gasoline evaporation means for receiving liquid gasoline and exposing it to an air stream,
   F. means forming a second air inlet for the delivery of air to said vapor passage after contact of the air with liquid gasoline in said evaporization means,
   G. second air controlling valve means for selectively opening and closing said second air inlet,
   H. heater means for maintaining a selected minimal temperature at least at said vapor passage,
   I. injector means for introducing water to said fuel mixture prior to exiting from said outlet port, and
   J. means for controlling one of said air valves in response to the pressure difference between the ambient and a lesser pressure within said carburetor, and means for controlling the other of said air valves and the water injection in response to engine conditions including the engine intake vacuum, the engine exhaust temperature, and the engine combustion chamber temperature.

15. Evaporative carburetor apparatus according to claim 14 in which said gasoline evaporation means includes a carrier of liquid gasoline interposed in the passage of air from said second inlet through said vapor passage.

16. Evaporative carburetor apparatus according to claim 14 further comprising means forming a valved bypass passage for delivering air from said second inlet to said vapor passage and bypassing said evaporation means.

17. Evaporative carburetor apparatus according to claim 14 further comprising particle arrester means for removing liquid gasoline from said fuel mixture being delivered to said outlet passage from said vapor passage.

* * * * *